(12) United States Patent
Phillips

(10) Patent No.: US 9,902,222 B1
(45) Date of Patent: Feb. 27, 2018

(54) CAPTIVE PIN APPARATUS FOR RETENTION OF A DRAWBAR IN A TRAILER HITCH RECEIVER

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 15/494,808

(22) Filed: Apr. 24, 2017

(51) Int. Cl.
B60D 1/28 (2006.01)
B60R 9/10 (2006.01)

(52) U.S. Cl.
CPC . B60D 1/28 (2013.01); B60R 9/10 (2013.01)

(58) Field of Classification Search
CPC ... B60D 1/02; B60D 1/28; B60D 1/34; B60D 1/025
See application file for complete search history.

(56) References Cited

U.S. PATENT DOCUMENTS

| 3,093,395 A * | 6/1963 | Boutwell | B60D 1/40 280/479.2 |
| 3,169,028 A * | 2/1965 | Scrivner | B60D 1/40 280/479.2 |
| 3,190,677 A * | 6/1965 | Robbins | B60D 1/02 280/515 |
| 3,912,119 A * | 10/1975 | Hill | B60D 1/40 280/479.2 |
| 4,451,066 A | 5/1984 | Collins | |
| 5,288,095 A | 2/1994 | Swindall | |
| 5,322,315 A * | 6/1994 | Carsten | B60D 1/40 280/479.2 |
| 5,378,008 A | 1/1995 | McCrossen | |
| 6,170,852 B1 | 1/2001 | Kimbrough | |
| 7,398,987 B2 | 7/2008 | Roe et al. | |
| 7,497,459 B2 * | 3/2009 | Johnson | A01D 41/16 280/515 |
| 7,850,193 B2 | 12/2010 | Williams, Jr. | |
| 8,210,560 B2 * | 7/2012 | Shaw | B60D 1/02 280/504 |
| 8,833,791 B2 * | 9/2014 | Prescott | B60R 9/06 280/506 |
| 2013/0032621 A1 * | 2/2013 | Bogoslofski | B60R 9/06 224/519 |
| 2016/0059648 A1 * | 3/2016 | Harper | B60D 1/52 280/507 |
| 2017/0057310 A1 | 3/2017 | Smith et al. | |

* cited by examiner

Primary Examiner — Joseph M Rocca
Assistant Examiner — Marlon A Arce
(74) Attorney, Agent, or Firm — John V. Stewart

(57) ABSTRACT

An arm (26, 56) attached to a trailer hitch drawbar (22) at an attachment point behind a given depth (D) of insertion of the drawbar into a trailer hitch receiver tube (24). At this depth a pin receiving hole (22A) in the drawbar aligns with a pin receiving hole (24A) in the receiver tube. The arm extends forward beside the drawbar to a position beside the pin receiving hole in the drawbar. A captive pin (21, 71) on the forward end of the arm is urged by a spring to slide into the aligned receiving holes (22A, 24A). The pin has a range of motion (T) sufficient for insertion into the pin receiving holes and retraction of the pin to clear the outer surface of the receiver tube when the drawbar is inserted into the receiver tube. A knob (42) on the pin provides for manual retraction.

14 Claims, 5 Drawing Sheets

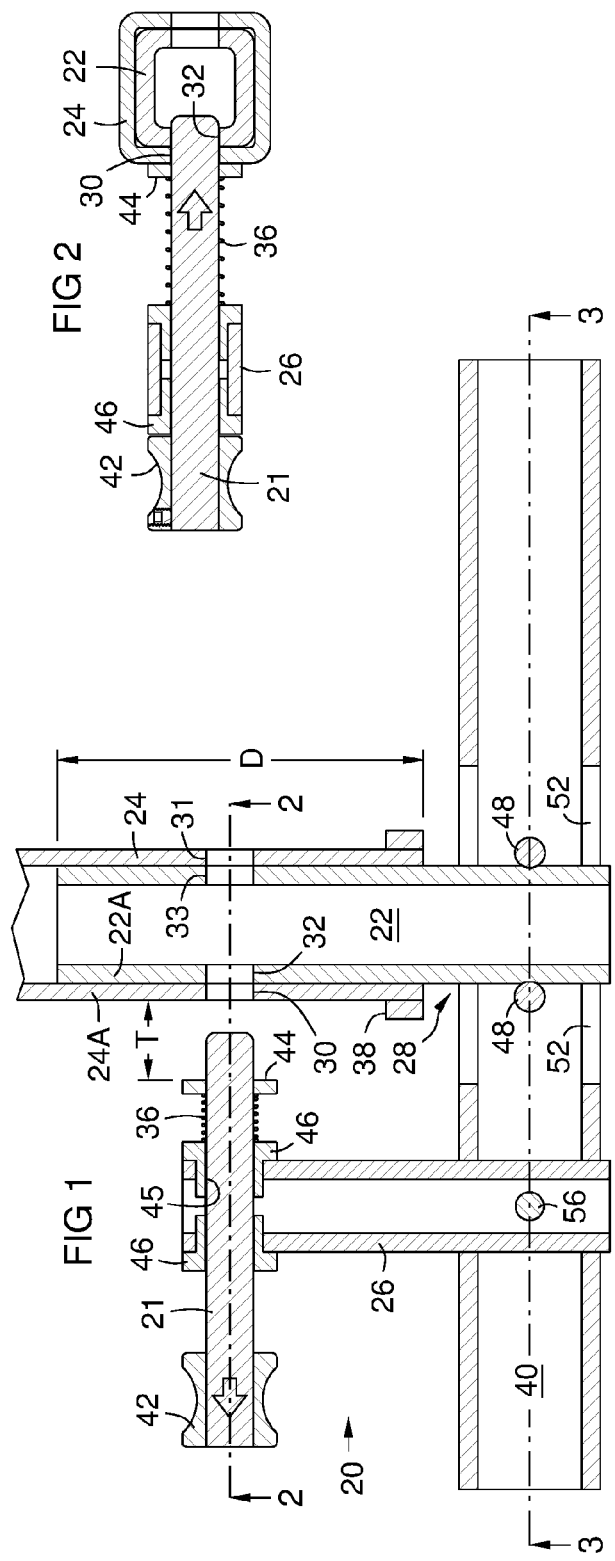
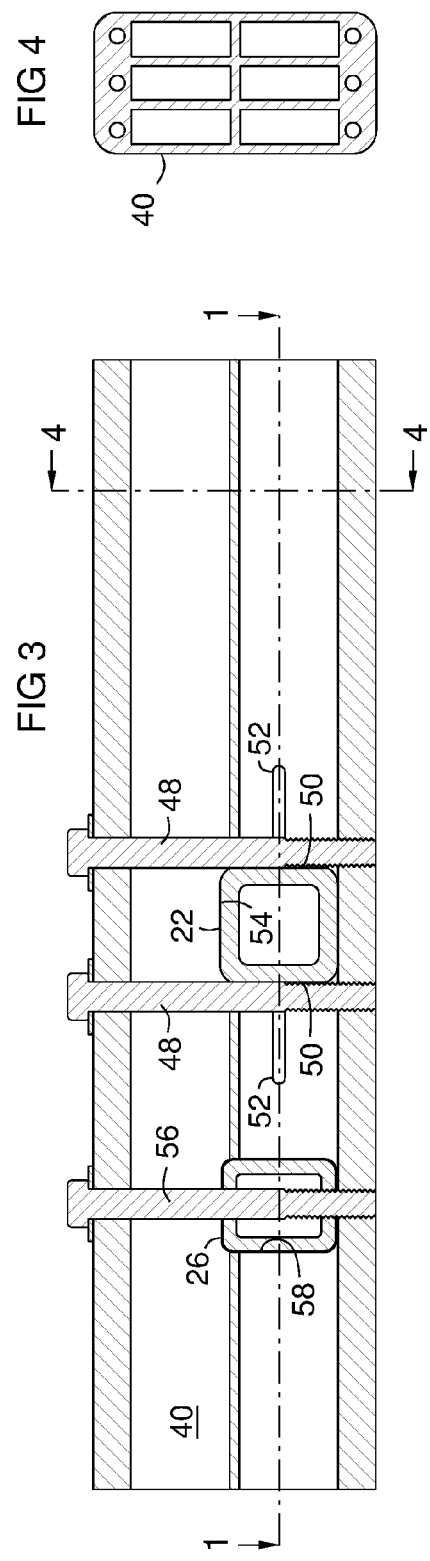

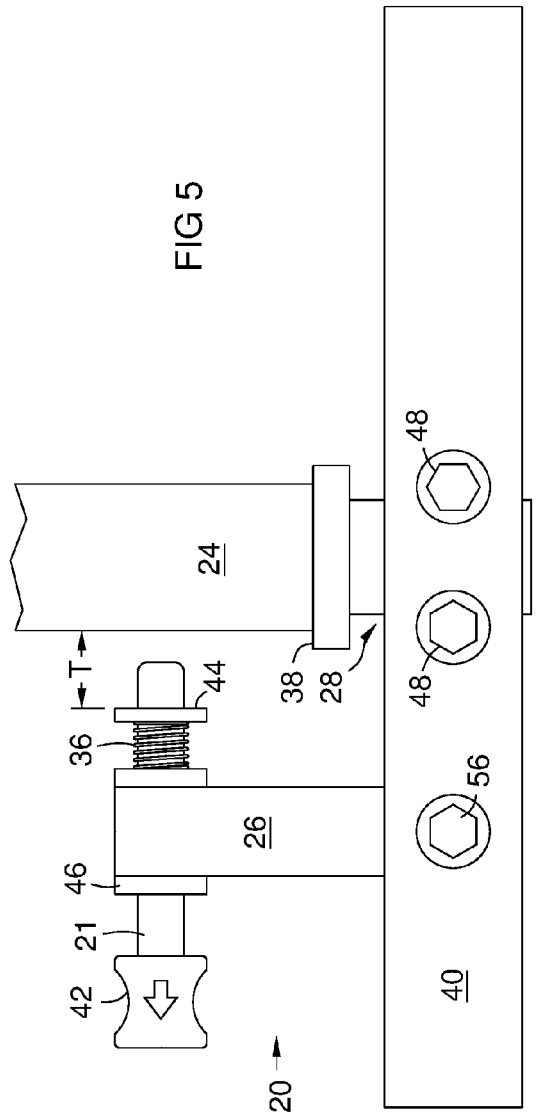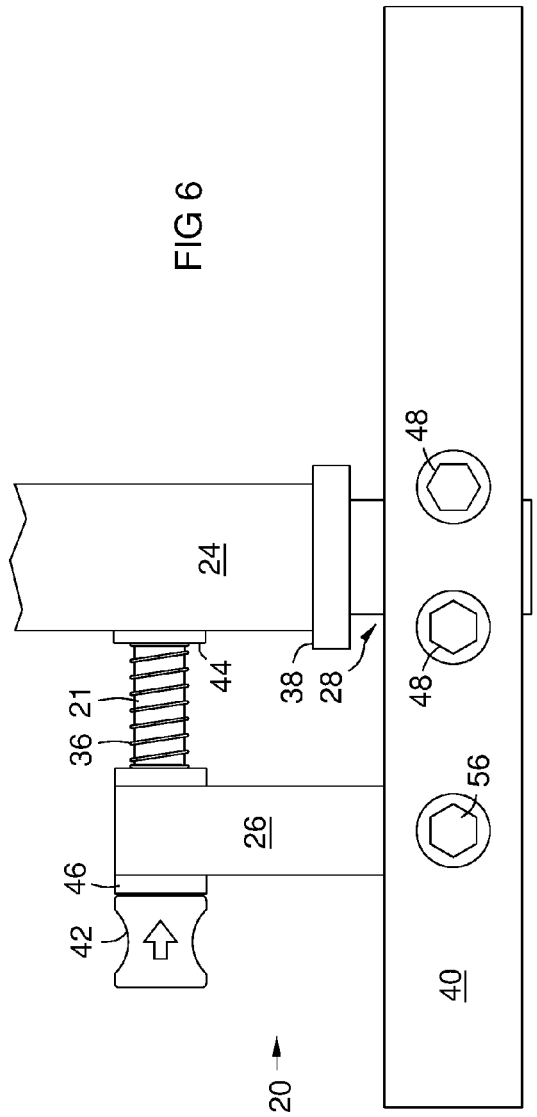

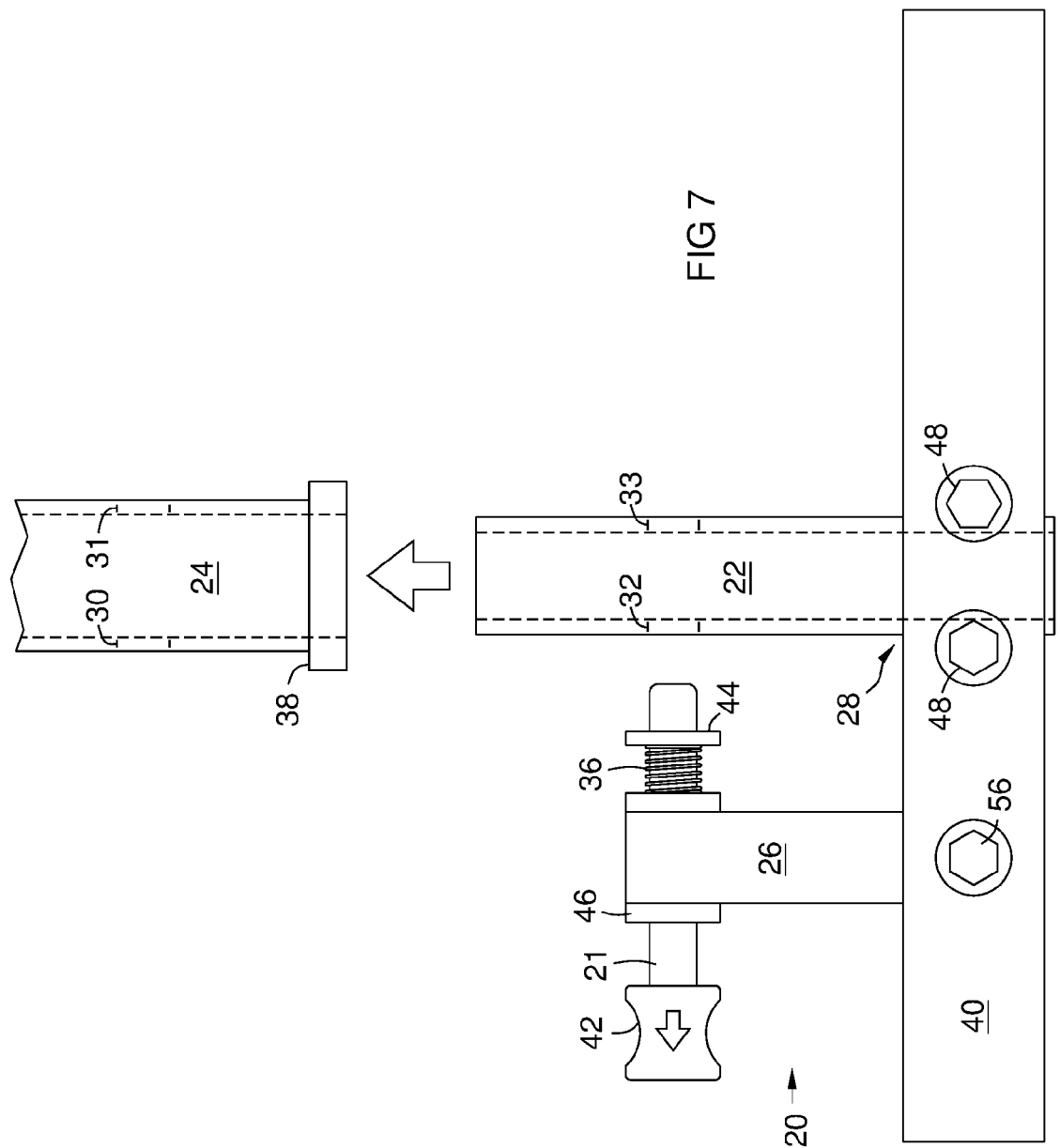

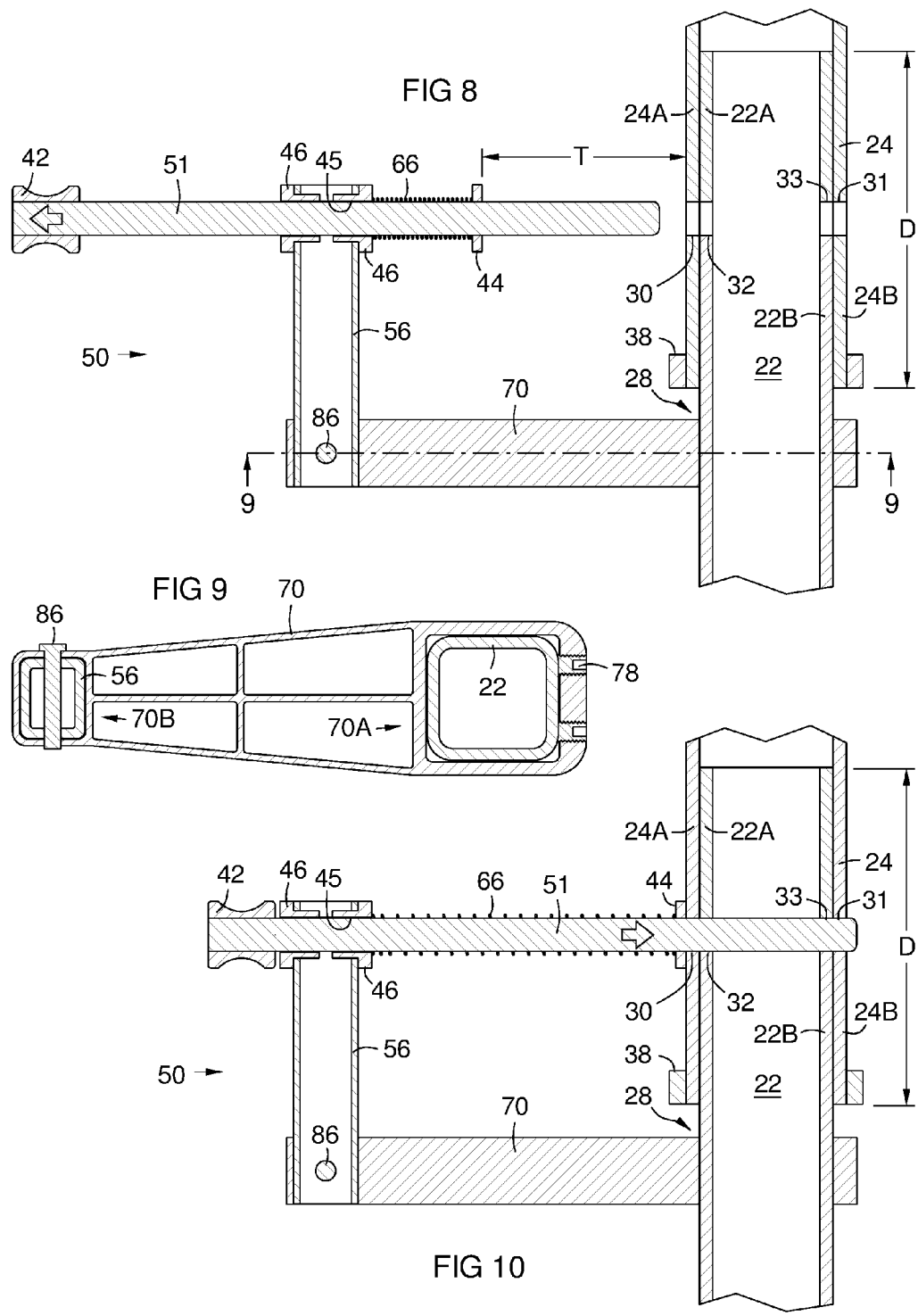

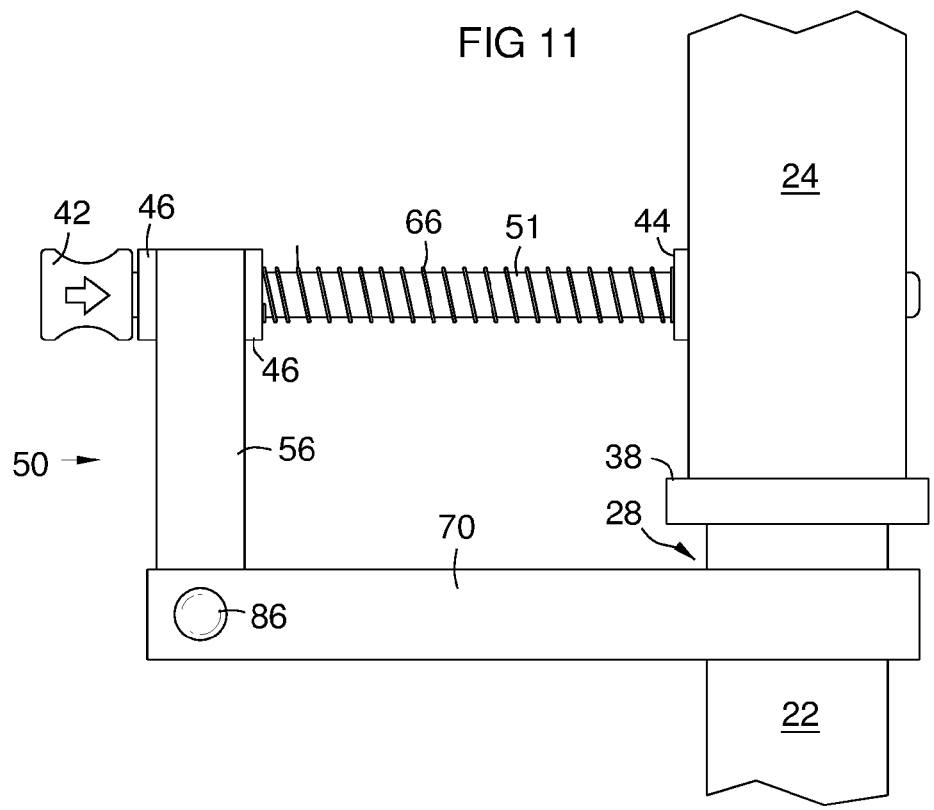

US 9,902,222 B1

CAPTIVE PIN APPARATUS FOR RETENTION OF A DRAWBAR IN A TRAILER HITCH RECEIVER

FIELD OF THE INVENTION

This invention relates to retention of a drawbar in a trailer hitch receiver tube, and particularly to a slidable captive pin that automatically finds and slides into the pin receiving hole in the receiver tube and drawbar when the drawbar is inserted therein to a hole alignment depth.

BACKGROUND OF THE INVENTION

A common type of trailer hitch provides a receiver tube attached to the back end of a motor vehicle frame or chassis below the bumper. A drawbar is inserted into the receiver tube and is retained therein by a pin that extends horizontally through the sides of the receiver tube and drawbar. The pin may be held by a cotter pin or other means. The drawbar can have a ball for towing a trailer, or it may be attached to an accessory such as a bicycle carrier to be attached to the vehicle.

Inserting the drawbar requires reaching under the bumper to hold the pin and push it inward with one hand while pushing the drawbar into the receiver tube with the other hand until the holes in the drawbar and the tube align and the pin slides through them. For later use, one can mark the drawbar at the insertion depth of hole alignment. However, an accessory such as a bike carrier attached to the drawbar can interfere with a user inserting the pin while reaching around or through the accessory, creating an awkward body position.

SUMMARY OF THE INVENTION

According to one aspect there is provided apparatus that retains a drawbar in a trailer hitch receiver tube, comprising a captive pin that is slidable into and out of a transverse pin retaining hole in a trailer hitch drawbar. The captive pin is retained in an arm attached to the drawbar at an attachment point located behind a given insertion depth of the drawbar into a trailer hitch receiver tube. The given insertion depth aligns the pin retaining hole in the drawbar with a corresponding pin retaining hole in the trailer hitch receiver tube. The captive pin slides into both of said pin retaining holes under force of a spring at the given insertion depth.

According to another aspect there is provided an arm attached to a drawbar at an attachment point behind a particular insertion depth of the drawbar in the receiver tube, the arm extending forward beside the drawbar to a position beside a pin receiving hole in the drawbar. A captive pin on the arm slides into the pin receiving hole in the drawbar and is urged by a spring into the pin receiving hole in the drawbar. The captive pin has a range of movement that includes insertion of the pin into the pin receiving hole in the drawbar and retraction sufficient to clear the hitch receiver tube when the drawbar is inserted into the hitch receiver tube. During insertion of the drawbar into the hitch receiver tube, the pin falls into a pin receiving hole in the receiver tube and into the pin receiving hole in the drawbar, the two pin receiving holes being aligned with each other at the particular insertion depth.

BRIEF DESCRIPTION OF THE DRAWINGS

The invention is explained in the following description in view of the drawings that show:

FIG. 1 is a top sectional view taken on line 1-1 of FIG. 3 showing a captive pin apparatus with the pin retracted showing aspects of an embodiment of the invention.

FIG. 2 is a sectional view of the pin taken on line 2-2 of FIG. 1 with the pin engaged.

FIG. 3 is a sectional view taken on line 3-3 of FIG. 1 showing a structural member of an accessory such as a bike carrier to which the captive is attached on an arm.

FIG. 4 is a side sectional view taken on line 4-4 of FIG. 3.

FIG. 5 is a top view of the apparatus of FIG. 1 with the pin retracted.

FIG. 6 is a top view of the apparatus of FIG. 1 with the pin engaged.

FIG. 7 is a top view of the apparatus of FIG. 1 during insertion of the drawbar into a trailer hitch receiver tube.

FIG. 8 is a top sectional view of an after-market embodiment of the invention.

FIG. 9 is a sectional view of an attachment bracket taken on line 9-9 of FIG. 8.

FIG. 10 is a top sectional view of the apparatus of FIG. 8 with the pin engaged.

FIG. 11 is a top view of the apparatus of FIG. 10.

DETAILED DESCRIPTION OF THE INVENTION

FIG. 1 shows an apparatus 20 with a captive sliding pin 21 that retains a drawbar 22 in a trailer hitch receiver tube 24. An arm 26 is attached to the drawbar at an attachment point 28 behind a given insertion depth D of the drawbar into the receiver tube. The insertion depth is the depth at which a pin receiving hole 30 in the hitch receiver tube 24 aligns with a pin receiving hole 32 in the drawbar. The arm extends forward beside the drawbar to hold the pin 21 beside and aligned with the pin receiving hole 32 in the drawbar. The pin is urged into the pin receiving hole in the drawbar by a spring 36. The pin has a range of movement T that includes inserting the pin into the pin receiving hole in the drawbar and retraction sufficient to clear the wall of the receiver tube 24 when the drawbar is inserted into the receiver tube. This includes clearing any reinforcement ring 38 or flange on the back end of the receiver tube. During insertion of the drawbar into the hitch receiver tube the pin falls into the hole 30 in the receiver tube and also slides into the hole 32 in the drawbar. The two holes 30 and 32 are aligned with each other when the drawbar is inserted into the receiver tube to the given insertion depth D of the drawbar. The drawbar 22 may be hollow as shown or it may be solid.

A knob 42 allows manual retraction of the pin, and also retains the pin on the arm 26, preventing inward escape of the pin through the holes 30, 31, 32, 33. A washer 44 can be pressed onto the pin 21 to retain the spring 36 on the pin and to prevent outward escape of the pin from the arm 26. Alternately, a circlip or flange may be used. The pin is laterally slidable in a hole 45 in the arm 26. Bushings 46 such as bronze may provide the pin mounting hole surrounded by low friction material with a large surface area for low wear.

The arm 26 may be attached to the drawbar by a structural member 40 of an accessory (not shown) attached to the drawbar for attaching the accessory to a motor vehicle via a hitch receiver on the vehicle. For example, the accessory may be a bike carrier or other non-wheeled accessory, as opposed to a trailer. A non-wheeled accessory does not pull on the drawbar substantially, so the pin 21 only needs to pass through one sidewall 24A of the receiver tube and the adjacent sidewall 22A of the drawbar, since shear on the pin is minimal. However, for a trailer, the pin should pass through both sides of the hitch receiver tube 24 and the drawbar 22 as later shown, because the pin takes substantial shear stress. The horizontal structural member 40 may be assembled to the drawbar 22 and the arm 26 with bolts 48, 56, and slots 52 as later described.

FIG. 2 is a sectional view taken on line 2-2 of FIG. 1, showing the pin translated inward by the spring 36 into the pin retention hole 30 in a sidewall 24A the hitch receiver tube and the corresponding pin retention hole 32 in an adjacent sidewall 22A of the arm 22. Inward pin movement can be stopped by the washer 44 and/or the knob 42. Herein, "inward" means toward the drawbar, "outward" means away from the drawbar, "the outer end of the pin" means the end farthest from the drawbar, and "the inner end of the pin" means the end nearest the drawbar.

FIG. 3 is a sectional view taken on line 3-3 of FIG. 1, showing the structural member 40. It may be welded to the drawbar 22 and the arm 26. Alternately, as shown, it can be assembled with bolts. For example, two bolts 48 may pass vertically through the structural member 40 and bracket the drawbar with interference provided by shallow vertical channels 50 in the sides of the drawbar. The interference holds the drawbar in the structural member even if the bolts are loose. Compressible slots 52 may be extend from the sides of the opening 54 in the structural member that receives the drawbar 22. This causes the opening 54 to clamp the drawbar firmly when the bolts 48 are tightened. A vertical bolt 56 may be used to attach the arm 26 to the structural member 40. It may pass through the arm with clearance, and the opening 58 for the arm may also have clearance, so the forward end of the arm can move vertically within a limited range such as at least 0.1 inch (2.5 mm) allowing the pin to find the pin receiving hole in the hitch tube within a given vertical tolerance.

FIG. 4 is a sectional view taken on line 4-4 of FIG. 3 illustrating an extrusion shape that may be used for the structural support member 40. FIG. 5 is a top view of the apparatus of FIG. 1 with the pin retracted. FIG. 6 is a top view of the apparatus of FIG. 1 with the pin inserted. FIG. 7 is a top view of the apparatus of FIG. 1 during insertion of the drawbar 22 into a trailer hitch receiver tube 24.

FIG. 8 is a top sectional view of an after-market embodiment 50 of the invention that can be attached to an existing drawbar by an end user. It has the same primary features as the embodiment of FIGS. 1-7. A laterally extending support bracket 70 attaches to the drawbar 22 to hold the arm 56. The pin 51 extends through both sides 24A, 24B of the hitch receiver tube 24 and both sides 22A, 22B of the drawbar 22 to support towing. The pin 51 is longer in this embodiment than previously shown, and the arm 56 is farther from the drawbar 22 to support a longer pin movement range T. The spring 66 is longer. A bolt or pin 86 may be used to attach the arm 56 to the support bracket 70.

FIG. 9 is a sectional view of the support bracket 70 taken on line 9-9 of FIG. 7. The support bracket 70 may have a first receptacle 70A that receives the drawbar 22. Setscrews 98 may be used to fix the drawbar 22 in the receptacle 70A. The support bracket 70 may have a second receptacle 70B that receives the arm 56. A bolt or pin 86 may be used to retain the arm 56 in the second receptacle 70B. The pin 86 and the second receptacle 70B may provide clearance for the arm 56 that allows vertical movement for the front end of the arm 56 within a limited range such as 0.1 inch (2.5 mm), so the pin 51 can find the pin receiving hole 30 in the hitch receiver tube 24 with allowance for manufacturing tolerances.

FIG. 10 is a top sectional view of embodiment 50 with the pin 51 engaged through both sides 24A, 24B of the hitch receiver tube 24 and both sides 22A, 22B of the drawbar 22 for towing a trailer with the drawbar 22. Alternately, the drawbar may be solid with the pin all the way through. FIG. 11 is a top external view of the apparatus of FIG. 10.

The invention provides fast and convenient coupling of a drawbar to a trailer hitch receiver for mounting an accessory to a motor vehicle or for towing a trailer. The pin cannot be lost since it is attached to the drawbar. It falls automatically through retaining holes in the receiver tube and drawbar when they align during insertion of the drawbar into the receiver tube.

Embodiments of the present invention shown and described herein are provided by way of example. Variations and substitutions may be made without departing from the invention. Accordingly, it is intended that the invention be limited only by the appended claims.

The invention claimed is:

1. A captive pin apparatus that retains a trailer hitch drawbar in a trailer hitch receiver tube, the captive pin apparatus comprising;
   a captive pin that is slidable into and out of a transverse pin retaining hole in the trailer hitch drawbar;
   the captive pin being slidably mounted in an arm, wherein the arm is attached to the drawbar at an attachment point located behind a given insertion depth of the drawbar into the trailer hitch receiver tube, the arm extending forward beside the drawbar to a position beside the pin receiving hole in the trailer hitch drawbar;
   the given insertion depth aligning the pin retaining hole in the drawbar with a corresponding pin retaining hole in the trailer hitch receiver tube, wherein the captive pin slides into both of said pin retaining holes under force of a spring at the given insertion depth.

2. The apparatus of claim 1 wherein the spring is a compression spring disposed around the captive pin and retained on the captive pin by a fixed washer or flange around the captive pin between the arm and an inner end of the pin, and the captive pin is retained on the arm by a manual gripping knob on an outer end of the pin and by the spring and fixed washer or flange.

3. The apparatus of claim 1 wherein the arm is attached to the drawbar by a structural member of a non-wheeled accessory to be attached to a motor vehicle via the trailer hitch receiver tube, and the captive pin has a range of motion that includes insertion of the pin into the pin receiving hole in the drawbar and retraction sufficient for the pin to clear the trailer hitch receiver tube during insertion of the drawbar therein.

4. The apparatus of claim 3 wherein the pin motion range provides an insertion depth of the pin through only one sidewall of the trailer hitch receiver tube and one adjacent sidewall of the drawbar.

5. The apparatus of claim 1, wherein the arm is attached to the drawbar by a laterally extending support bracket comprising a receptacle that slides over the drawbar, and one or more machine screws that tighten against the drawbar, fixing the laterally extending support bracket to the drawbar.

6. The apparatus of claim 5, wherein the pin and the laterally extending support bracket are dimensioned to provide clearance between an inner end of the pin and the trailer hitch receiver tube in a retracted position of the captive pin.

7. The apparatus of claim 5, wherein the arm is inserted into a second receptacle of the laterally extending support bracket and is retained therein by one or more pins or a further one or more machine screws.

8. The apparatus of claim 7, wherein said one or more pins or said further one or more machine screws pass through respective holes or channels in the arm, wherein said holes or channels in the arm each provide at least 0.02 inches (0.5 mm) of diametric clearance for the respective machine screws or pins, providing the arm with a range of vertical play so the captive pin can align vertically with the pin receiving hole in the trailer hitch receiver tube.

9. The apparatus of claim 7, wherein said one or more pins or said further one or more machine screws pass through respective holes or channels in the arm, wherein said holes or channels in the arm each provide a clearance for the respective pins or machine screws that provides at least 0.1 inch (2.5 mm) of vertical play at the front end of the arm so the captive pin can align vertically with the pin receiving hole in the trailer hitch receiver tube.

10. A captive pin apparatus that retains a drawbar in a trailer hitch receiver tube, the captive pin apparatus comprising;
   an arm attached to the drawbar at an attachment point behind a particular insertion depth of the drawbar in the trailer hitch receiver tube, the arm extending forward beside the drawbar to a position beside a pin receiving hole in the drawbar; and
   a captive pin slidably mounted in the arm for translation of the pin relative to the arm, wherein the captive pin slides into the pin receiving hole in the drawbar and is urged by a spring into the pin receiving hole in the drawbar;
   wherein the captive pin has a range of motion that includes insertion into the pin receiving hole in the drawbar and retraction sufficient to clear the trailer hitch receiver tube when the drawbar is inserted into the trailer hitch receiver tube;
   wherein during an insertion of the drawbar into the trailer hitch receiver tube the pin falls into a pin receiving hole in the trailer hitch receiver tube and into the pin receiving hole in the drawbar, said two pin receiving holes being aligned with each other at the particular insertion depth; and
   wherein the arm is attached to the drawbar by a laterally extending support bracket comprising a receptacle that slides over the drawbar, and one or more machine screws that tighten against the drawbar, fixing the laterally extending support bracket to the drawbar.

11. The apparatus of claim 10, wherein the pin and the laterally extending support bracket are dimensioned to provide clearance between an inner end of the pin and the trailer hitch receiver tube in a retracted position of the captive pin.

12. The apparatus of claim 10, wherein the arm is inserted into a second receptacle of the laterally extending support bracket and is retained therein by one or more pins or a further one or more machine screws.

13. The apparatus of claim 12, wherein said one or more pins or said further one or more machine screws pass through respective holes or channels in the arm, wherein said holes or channels in the arm each provide at least 0.02 inches (0.5 mm) of diametric clearance for the respective machine screws or pins, providing the arm with a range of vertical play so the captive pin can align vertically with the pin receiving hole in the trailer hitch receiver tube.

14. The apparatus of claim 12, wherein said one or more pins or said further one or more machine screws pass through respective holes or channels in the arm, wherein said holes or channels in the arm each provide a clearance for the respective pins or machine screws that provides at least 0.1 inch (2.5 mm) of vertical play at the front end of the arm so the captive pin can align vertically with the pin receiving hole in the trailer hitch receiver tube.

* * * * *